Jan. 7, 1936.  G. L. HANSEN  2,026,784

MACHINE FOR TESTING ACCURACY OF GEARS

Filed Oct. 12, 1931

INVENTOR
Gustof L. Hansen
BY Whittemore Hulbert
Whittemore & Belknap
ATTORNEYS

Patented Jan. 7, 1936

2,026,784

UNITED STATES PATENT OFFICE 2,026,784

MACHINE FOR TESTING ACCURACY OF GEARS

Gustof L. Hansen, Detroit, Mich., assignor to National Broach & Machine Company, Detroit, Mich., a corporation of Michigan Application October 12, 1931, Serial No. 568,507

6 Claims. (Cl. 33—174)

The invention relates to gear testing mechanisms adapted for use in determining the accuracy of the gears in various essential characteristics. It is the object of the present invention to obtain a construction, first, for accurately indicating any deviation in the teeth of the gear from a predetermined helical angle; second, to provide for other accuracy tests such as tooth contour, eccentricity, etc. With these objects in view the invention consists in the construction as hereinafter set forth.

Figure 1:
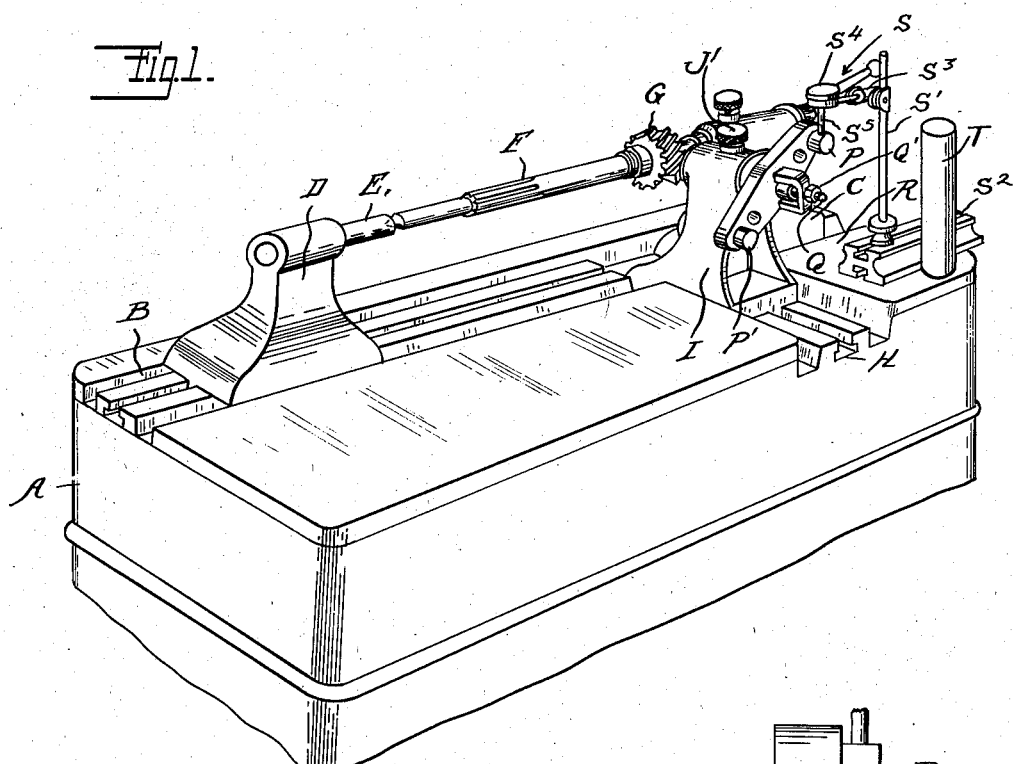
Figure 1 is a perspective view of my improved testing mechanism.
Figure 2:
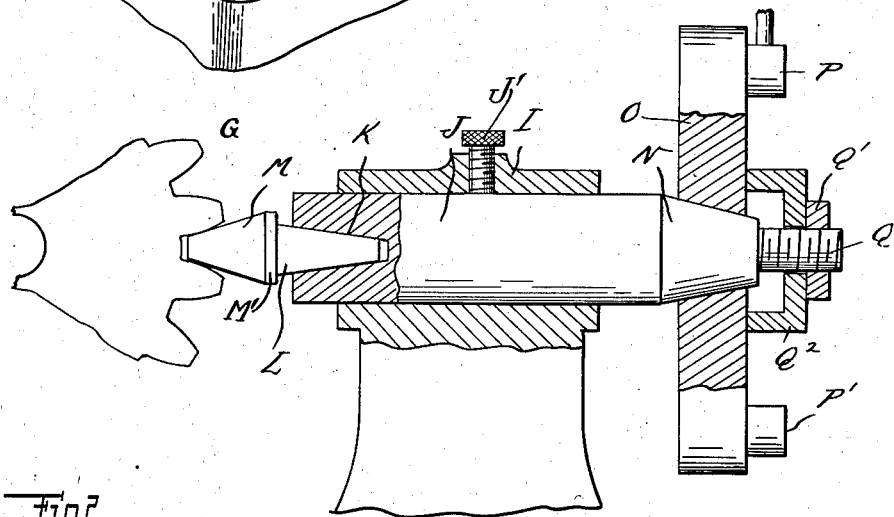
Figure 2 is a sectional elevation of a portion thereof.

As shown, A is a suitable bed forming a mounting for the gear to be tested. The upper end of this bed is provided with ways B for relatively adjustable head and tail stocks C and D carrying centers E for supporting an arbor F on which the gear G to be tested is mounted. H is a transversely extending way for supporting an adjustable head I having journaled therein a shaft J so positioned that its axis will intersect the axis of the arbor F and is exactly perpendicular thereto at the longitudinal center of the gear to be tested. The shaft J has formed in one end thereof a tapered socket K for receiving a correspondingly tapered shank L on a truncated transversely extending wedge shaped member M of a predetermined angle. At the opposite end of the shaft is a tapered portion N which engages a tapered socket in an arm O extending on diametrically opposite sides of the shaft. This arm is provided with a pair of cylindrical pins P and P' projecting therefrom which are so arranged that their axes lie exactly in the plane of the axis of the shaft J and are parallel thereto at exactly equal distances therefrom. The arm O is frictionally clamped upon the tapered portion N of the shaft by means of a threaded shank Q projecting from the end of the shaft and a clamping nut Q' and spacer $Q^2$.

The upper face of the frame A is provided with a surface plate R in a plane exactly parallel to the common plane of the axes of the shaft J and arbor F. Resting upon this surface plate is a surface gauge S for indicating the height of the pins P and P' above the surface R and thereby indicating the exact angle of the arm O to said surface. This gauge preferably comprises a standard S' adjustably mounted on a slotted base $S^2$ and having an arm $S^3$ vertically adjustably secured to the standard with a gauge indicator $S^4$ at the outer end thereof and a depending contact finger $S^5$ for engaging the pin P.

With the parts constructed as described the operation of testing gears is as follows: The gear to be tested is first mounted upon the arbor F which being mounted upon the centers E is free to be revolved but is held with its axis parallel to the plane of the table. The wedge M is held in fixed relation to the shaft J by frictional engagement of the tapered shank L in the tapered socket K. The wedge is movable with the shaft J and adjustable head I so as to engage the interdental space between adjacent teeth of the gear to be tested. However, before so engaging the wedge with said teeth the arm O is adjusted to be exactly parallel with the median plane of the wedge and is then clamped by the nut Q' to maintain this adjustment. The wedge is of truncated form, its opposite faces having an angle of divergence corresponding to a predetermined pressure angle for the gear to be tested and with the line of intersection of the projected surfaces of said wedge perpendicular to the axis of the shank L. Also there is preferably a portion M' at the ridge having faces parallel to the median plane of the wedge. The setting of this arm and wedge in parallelism may be effected by first setting the faces M' of the wedge in parallelism to the table or surface plate R and by means of the surface gauge S, then clamping the shaft J in the standard I by means of the set screw J', then setting the arm O in parallelism with the surface plate R by means of the surface gauge S and clamping the arm in this position by the nut Q'. When this is accomplished the set screw J' may be released to permit of turning the shaft J so that the wedge M may be inserted in the interdental space between adjacent teeth of the gear to be tested and is free to arrange itself in parallelism therewith. The height of the pin P above the surface plate R is then tested by the gauge S preferably by first setting said gauge to a zero reading at a predetermined height as by means of the standard height block T resting on the surface plate R. When so set, the height of the pin P is tested and if this exactly corresponds to the height of the block T, the reading on the gauge will be zero, but if there is any deviation in height the amount of difference will be indicated on the gauge. Thus assuming that the block T is the proper height for the pin P when the wedge M is set at the desired helical angle, then the teeth may be successively tested by inserting the wedge between parts thereof and any deviation from this proper angle will be indicated by plus or minus readings on the gauge.

The geometrical principle on which this testing is based is that the involute surfaces of adjacent helical gear teeth if accurate in form will have line contact with the opposite faces of a wedge of correct pressure angle inserted therebetween from one end of each tooth to the other, said lines being, however, at opposite angles to the axis of the gear in the respective planes of the wedge faces. This will arrange the plane of the wedge at the exact helical angle of the teeth. It is therefore possible to indicate and to measure the deviation of teeth from the true helical angle by an indicator mechanism operating in conjunction with the wedge. In the specific construction above described any change in angle of the wedge will rotate the shaft J and the arm O, correspondingly displacing the pins P and P'. Thus by means of the gauge S the displacement of one of the pins P and P' is measured, which establishes the error of the gear tooth in helical angle.

What I claim as my invention is:

1. A gear testing machine comprising a support for rotatably mounting the gear to be tested, a truncated wedge for insertion between and into contact with adjacent teeth of said gear, the angle of divergence between opposite sides of said wedge corresponding with a predetermined pressure angle of the gear, a holder for said wedge rotatably mounted on said support permitting rotation of said wedge about an axis radial with respect to the gear, and means engaging said holder for indicating rotational displacement of said wedge with respect to said support on engagement of same with successive teeth of the gear.

2. A gear testing machine comprising a bed, a holder on said bed for rotatably mounting the gear to be tested for rotation about the axis thereof, a second holder revoluble and longitudinally movable with respect to said bed about an axis radial with respect to the gear, a truncated wedge mounted at one end of said second holder for insertion between and into contact with adjacent teeth of the gear, the angle of divergence of the opposite faces of said wedge corresponding to a predetermined pressure angle for the gear, and means engaging said wedge holder for measuring rotational displacement of said wedge holder with respect to said bed during engagement with successive teeth of the gear.

3. A gear testing machine comprising a bed, a rotative mounting on said bed for a gear to be tested, a shaft extending radially with respect to said gear, a bearing on said bed in which said shaft is rotatively and axially movable, a truncated wedge mounted on one end of said shaft to be insertable by axial movement thereof between and in contact with adjacent teeth of the gear, a member rotatively adjustably secured to the opposite end of said shaft, means for setting the latter member in parallelism with the median plane of said wedge and means engaging said member for indicating the angular displacement of said member with respect to said bed during successive engagements of said wedge between teeth of the gear.

4. A gear testing machine comprising a bed, a rotary arbor mounted on said bed for holding a gear to be tested, a shaft having its axis radial with respect to said gear to be tested, a mounting on said bed in which said shaft is rotatively and axially movable, a tapered socket at the end of said shaft adjacent to said gear, a truncated wedge having a tapered shank engaging said socket and frictionally held from rotation therein, the angle of divergence between opposite sides of said wedge corresponding to a predetermined pressure angle for the gear, an arm mounted on the opposite end of said shaft and rotatively adjustable thereon into parallelism with the median plane of said wedge, a cylindrical pin extending from an outer end of said arm with its axis parallel to the axis of said shaft, and an indicator engageable with said pin to indicate any angular displacement of said shaft during successive engagements of said wedge between teeth of the gear.

5. A gear testing machine comprising a bed, means for rotatably mounting a gear to be tested on said bed, a rotatable member mounted on said bed with its axis extending radially with respect to said gear, a tooth secured to said rotatable member and adapted to be inserted between adjacent teeth of said gear into contact with one of said teeth and means engaging said rotatable member for indicating the rotational position of said rotatable member with respect to said bed.

6. A gear testing machine comprising a bed, means for rotatably mounting a gear to be tested on said bed, a rotatable member mounted on said bed with its axis extending radially with respect to said gear, a contacting member secured to said rotatable member and adapted to be inserted between adjacent teeth of said gear, said contacting member having one face thereof inclined to a predetermined pressure angle, means for maintaining said inclined surface in contact with one of said adjacent teeth thereby rotatably positioning said rotatable member with respect to said bed in accordance with the characteristics of the gear tooth in contact with said inclined surface and means for indicating the variation between the rotational position of said rotatable member when in contact with said gear tooth and the theoretical position of said rotatable member when in contact with a corresponding gear tooth of exact accuracy.

GUSTOF L. HANSEN.